(12) United States Patent
Nakahara

(10) Patent No.: US 10,884,675 B2
(45) Date of Patent: Jan. 5, 2021

(54) IMAGE FORMING APPARATUS AND METHOD FOR THE SAME

(71) Applicant: CANON KABUSHIKI KAISHA, Tokyo (JP)

(72) Inventor: Hidetaka Nakahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/011,491

(22) Filed: Jun. 18, 2018

(65) Prior Publication Data

US 2018/0300091 A1 Oct. 18, 2018

Related U.S. Application Data

(63) Continuation of application No. 13/447,694, filed on Apr. 16, 2012, now abandoned.

(30) Foreign Application Priority Data

Apr. 21, 2011 (JP) ................................. 2011-095180

(51) Int. Cl.
*G06F 3/12* (2006.01)
*G06K 15/02* (2006.01)

(52) U.S. Cl.
CPC .......... *G06F 3/1204* (2013.01); *G06F 3/1231* (2013.01); *G06F 3/1232* (2013.01); *G06K 15/1805* (2013.01); *G06F 3/1246* (2013.01)

(58) Field of Classification Search
None
See application file for complete search history.

(56) References Cited

U.S. PATENT DOCUMENTS

2010/0007908 A1 * 1/2010 Homma ............. G03G 15/5012
358/1.14

FOREIGN PATENT DOCUMENTS

| EP | 2230599 A1 * | 9/2010 | ........... G06F 9/4451 |
| EP | 2230599 A1 * | 9/2010 | ........... G06F 9/4451 |

* cited by examiner

*Primary Examiner* — Richa Mishra
(74) *Attorney, Agent, or Firm* — Canon U.S.A., Inc. I.P. Division

(57) ABSTRACT

An image forming apparatus compares device identification information acquired from XML setting information received from a connected device with device identification information of the image forming apparatus, and determines an import level based on a comparison result. The image forming apparatus extracts a setting according to the import level using each module of a plurality of applications for the image forming apparatus, and stores the extracted setting in a storage that is used for control performed in each application. The device identification information that determines the import level includes at least one of firmware version, destination information, user editing information, accessory connection information, and license information, in addition to model management number and machine body management number.

3 Claims, 16 Drawing Sheets

| | UserEdit | MODEL MANAGEMENT NUMBER | SN | FrimVer/DBVer | DESTINATION/ ABINCH | | IMPORT LEVEL APPLIED |
|---|---|---|---|---|---|---|---|
| CASE 1 | YES | - | - | - | - | → | Lv1 |
| CASE 2 | NO | NON-COINCIDENT | - | - | COINCIDENT | → | Lv3 |
| CASE 3 | NO | COINCIDENT | NON-COINCIDENT | NEWER THAN SPECIFIC VERSION | COINCIDENT | → | Lv2 |
| CASE 4 | NO | COINCIDENT | COINCIDENT | NEWER THAN SPECIFIC VERSION | COINCIDENT | → | Lv1 |
| CASE 5 | NO | COINCIDENT | - | OLDER THAN SPECIFIC VERSION | COINCIDENT | → | Lv3 |
| CASE | NO | NO | - | - | NON-COINCIDENT | → | Lv0 |

FIG.6

CREATE TABLE KeyList (KeyID, ParentID, Name, Meta) — 601
CREATE TABLE ValueList (KeyID, Value, Size, Type)
CREATE TABLE ValueRange (KeyID, Min, Max)

602

| KeyID | Name | ParentID | Meta |
|---|---|---|---|
| 1 | device_settings | NULL | 0x00000000 |
| 2 | address_book_settings | 1 | 0x00000000 |
| 3 | department_id_settings | 1 | 0x00000000 |
| 4 | common_setup | 1 | 0x00000000 |
| 5 | init_screen_setup | 4 | 0x00008030 |
| 6 | mmi_aclr_return | 4 | 0x00008030 |
| 7 | mmi_beep_onoff | 4 | 0x00008030 |
| 8 | inch_size_input | 4 | 0x00008030 |
| 9 | print_setup | 4 | 0x00000000 |
| 10 | cassette_sel | 9 | 0x00008030 |

603

| KeyID | Value | Size | Type |
|---|---|---|---|
| 5 | 0 | 2 | UINT |
| 6 | 0 | 2 | UINT |
| 7 | 7 | 4 | UINT |
| 8 | 1 | 2 | UINT |
| 10 | 0 | 2 | UINT |

604

| KeyID | min | max |
|---|---|---|
| 7 | 0 | 10 |

605

```
<?xml version="1.0" encoding="utf-8" ?>
<device_settings>
   <address_book_settings>
         :
   </address_book_settings>
   <department_id_settings>
         :
   </department_id_settings>
   <common_setup>
      <init_screen_setup type="uint" size ="2">1</init_screen_setup>
      <mmi_aclr_return type="uint" size ="2">0</mmi_aclr_return>
      <mmi_beep_onoff type="uint" size ="4" min="0" max="10">0</mmi_beep_onoff>
      <inch_size_input type="uint" size ="2">1</inch_size_input >
      <printer_setup>
         <cassette_sel type="uint" size ="2" >0</cassette_sel>
            :
   </common_setup>
</device_settings>
```

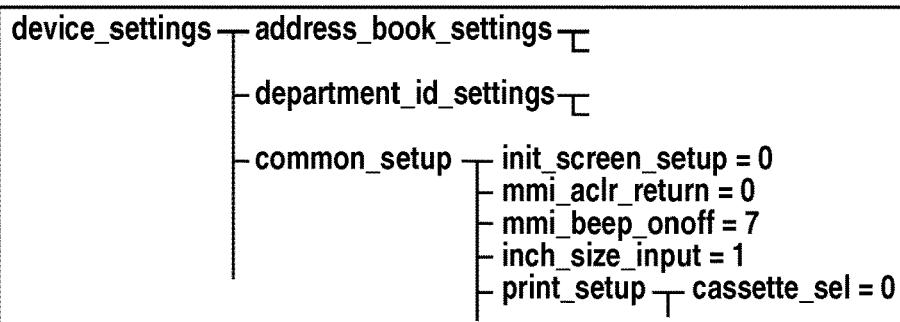

| DEVICE IDENTIFICATION INFORMATION (LEVEL DETERMINATION FACTOR) | DESCRIPTION |
|---|---|
| MODEL MANAGEMENT NUMBER (MODEL CODE) | SERIES NAME OF DEVICE |
| MACHINE BODY MANAGEMENT NUMBER (SN) | INDIVIDUAL IDENTIFICATION NUMBER |
| FIRMWARE VERSION | VERSION OF CONTROLLER DEDICATED TO RELATED DEVICE SERIES |
| DESTINATION INFORMATION | DESTINATION (COUNTRY/REGION, LANGUAGE) OF THE DEVICE |
| A/B/INCH INFORMATION | PAPER SIZE STANDARDS OF THE DEVICE (A SERIES, B SERIES, INCH SERIES) |
| POLICY DB VERSION | SCHEMA OF POLICY DB AND VERSION OF DATA |
| USER EDITING INFORMATION | INFORMATION INDICATING WHETHER DATA HAS BEEN REWRITTEN BY USER AFTER EXPORT |
| ACCESSORY CONNECTION INFORMATION | INFORMATION RELATING TO FINISHER AND PAPER FEEDING/ DISCHARGE CONFIGURATION |
| LICENSE | INFORMATION RELATING TO APPLIED LICENSE |

FIG.14

| | UserEdit | MODEL MANAGEMENT NUMBER | SN | FrimVer/DBVer | DESTINATION/ ABINCH | | IMPORT LEVEL APPLIED |
|---|---|---|---|---|---|---|---|
| CASE 1 | YES | — | — | — | — | → | Lv1 |
| CASE 2 | NO | NON-COINCIDENT | — | — | COINCIDENT | → | Lv3 |
| CASE 3 | NO | COINCIDENT | NON-COINCIDENT | NEWER THAN SPECIFIC VERSION | COINCIDENT | → | Lv2 |
| CASE 4 | NO | COINCIDENT | COINCIDENT | NEWER THAN SPECIFIC VERSION | COINCIDENT | → | Lv1 |
| CASE 5 | NO | COINCIDENT | — | OLDER THAN SPECIFIC VERSION | COINCIDENT | → | Lv3 |
| CASE | NO | NO | — | — | NON-COINCIDENT | → | Lv0 |

IMAGE FORMING APPARATUS AND METHOD FOR THE SAME

CROSS REFERENCE TO RELATED APPLICATIONS

The present application is a continuation of U.S. patent application Ser. No. 13/447,694, filed on Apr. 16, 2012, which claims priority from Japanese Patent Application No. 2011-095180 filed Apr. 21, 2011, all of which is hereby incorporated by reference herein in their entirety.

BACKGROUND OF THE INVENTION

Field of the Invention

The present invention relates to a technique capable of managing setting information of an image forming apparatus, such as a printer, a copying machine, or a multifunction peripheral having multiple functions.

Description of the Related Art

A recent image forming apparatus has a plurality of functions prepared beforehand, and has the capability of additionally installing various applications. A user of the image forming apparatus can use these functions and applications directly or via a network. The setting information increases in the number of items to be set or adjusted if the total number of the functions increases. Thus, an initial setup of an image forming apparatus for office use takes a significant time.

Hence, prior to the delivery of the apparatus to an office system, a selling agent is required to perform preliminary kitting that includes a work for introducing and setting applications and options according to the system beforehand in a batch manner. More specifically, a worker performs a manual setting work considering setup conditions received beforehand from the delivery destination as well as setting information extracted from an existing device (e.g., a target machine to be replaced) of the delivery destination.

Hence, in a situation that the worker is forced to work concentratedly to deliver a large number of machines during a busy time, it will be difficult to secure a sufficient lead-time for the shipment. Further, even in a case where the adjustment and setting work has been completed before shipment, the delivered machine may not smoothly operate due to ambient conditions (e.g., vibrations during transportation, temperature difference, and humidity difference). In such a case, the worker may be requested to replace the delivered machine by a non-defective one. In this case, it is necessary to perform the setting work again for the delivered image forming apparatus. In such a case, it is desired that the setting values can be quickly reflected in the image forming apparatus.

As a conventional technique, it is feasible for an apparatus to acquire or distribute common setting items from or to another apparatus when the apparatus is connected to a network or a memory medium. For example, according to a management method discussed in Japanese Patent Application Laid-Open No. 2008-238799, setting information common to a plurality of models is discriminated from setting information effective only to a specific model and can be separately output to an external storage device. Further, it is feasible to select effective setting values exclusively from an external storage device and store the acquired setting values in an internal nonvolatile memory.

However, the setting information of a recent image forming apparatus is finely classified into a plurality of categories, such as setting information relating to image forming processing, setting information relating to image processing, setting information relating to installed applications, unique information relating to each device configuration only, and common information relating to initial values of common functions (including an address book) that are common to a plurality of models.

For example, unique setting information that is dependent on a device configuration is applicable to only an image forming apparatus that has the same device configuration. In an image forming apparatus having a different configuration, a setting item having a different format and the value thereof are used in management.

Further, setting information relating to license or security is information unique to each machine body due to operational reasons, and therefore cannot be equally used for another image forming apparatus even when the apparatus has the same configuration. As another example, unique setting information dependent on each application can be managed using setting items that have a format variable depending on each vendor that has designed the application.

Further, setting information relating to new functions of a brand-new model or functions relevant to updated specification is initially managed as unique setting information. However, these functions are gradually applied to all models as time goes on. Therefore, unique setting information is no longer new and will be classified into (or regarded as) common setting information as it becomes older.

Hence, according to the technique discussed in Japanese Patent Application Laid-Open No. 2008-238799, an update flag indicating transmission allowance and acceptance allowance is allocated to each setting item to manage the device information and a setting value of the update flag can be managed. In other words, the setting information is managed fixedly for each setting item using the update flag.

As described above, the setting information of each image forming apparatus is finely classified into a plurality of categories depending on the use of the information. Therefore, the management method discussed in Japanese Patent Application Laid-Open No. 2008-238799 is insufficient to realize satisfactory management. Further, if the above-described flag indicates that the transmission is disabled, the setting value cannot be transmitted to an external device. In such a case, if the above-described change to the common setting occurs, it is unable to transfer the setting value to another device flexibly.

SUMMARY OF THE INVENTION

The present invention is directed to a management technique in which various pieces of device identification information of an image forming apparatus are sufficiently taken into consideration to classify setting information of an image forming apparatus appropriately and transfer the setting information to another device flexibly.

According to an aspect of the present invention, an image forming apparatus configured to control a plurality of applications according to setting information includes a storage unit configured to store, in a temporary region, setting information, described in Extensible Markup Language (XML), that is received from a connected device, an acquisition unit configured to acquire device identification information from the setting information stored in the temporary region, a determination unit configured to compare the device identification information acquired by the acquisition unit with device identification information of the image forming apparatus and to determine an import level used to reflect each setting included in the setting information stored in the temporary region, and a storing unit configured to extract a setting to be reflected according to the import level from the stored setting information using each module of the plurality of applications, and to store the extracted setting in a storage that is used for control performed in each application, wherein the device identification information that determines the import level includes at least one of firmware version, destination information, user editing information, accessory connection information, and license information, in addition to model management number and machine body management number.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a sample of database (DB) schema and a sample of Extensible Markup Language (XML) schema.

FIG. 13 illustrates level determination factors according to a second exemplary embodiment of the present invention.

FIG. 14 is a table that can be used to determine a level based on level determination factors according to the second exemplary embodiment of the present invention.

DESCRIPTION OF THE EMBODIMENTS

Various exemplary embodiments, features, and aspects of the invention will be described in detail below with reference to the drawings.

Figure 1:
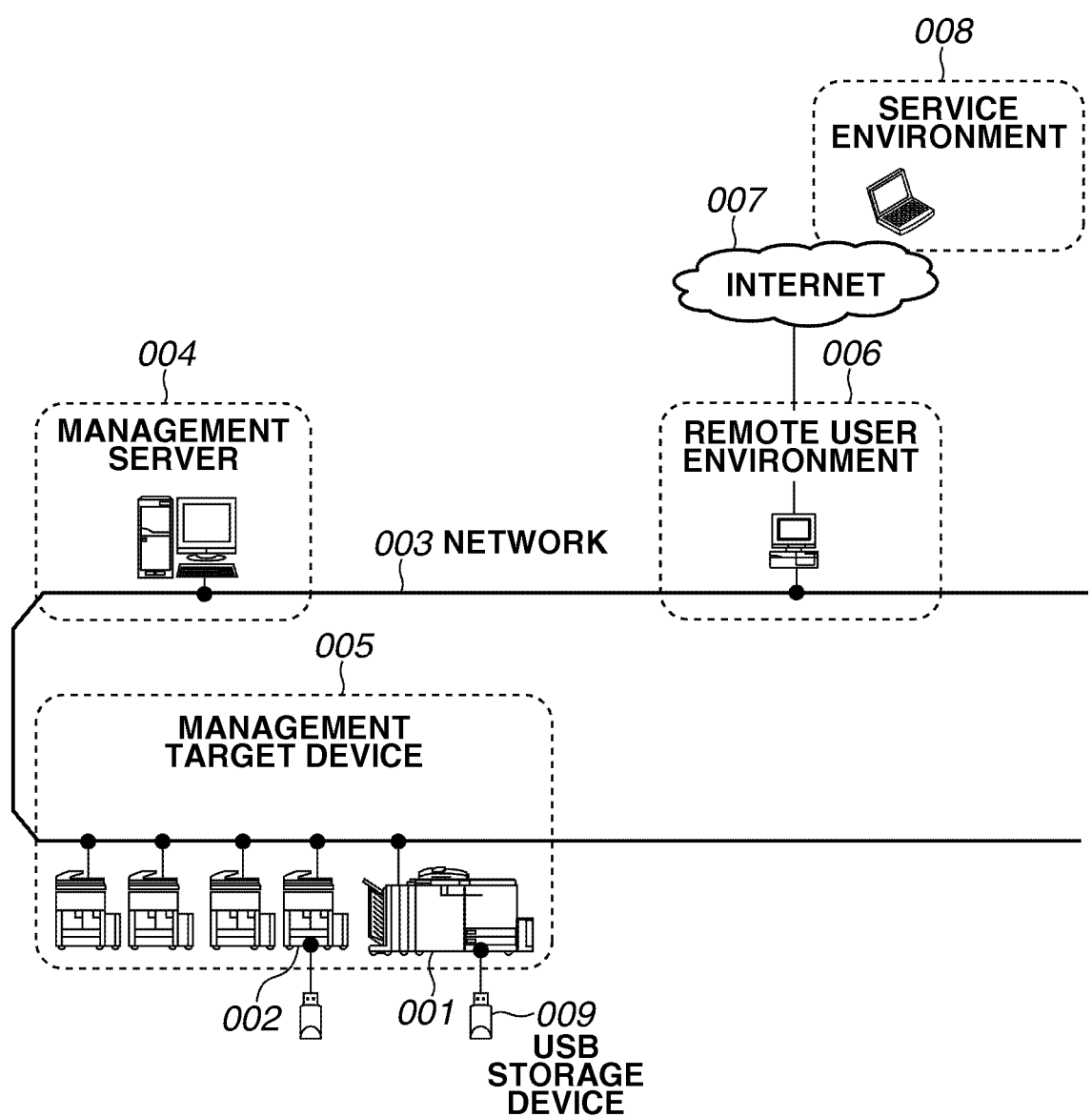
FIG. 1 illustrates an example configuration of a system including an image forming apparatus according to an exemplary embodiment of the present invention.

FIG. 1 illustrates a general system configuration according to an exemplary embodiment of the present invention, which includes at least one image forming apparatus, such as a printing apparatus, a copying machine, or a multifunction peripheral having a plurality of functions. The system illustrated in FIG. 1 includes a copying machine 001 and a copying machine 002, which can read an image of a document, perform image processing on the read document image, and output a copied product. Further, each copying machine serves as a printer that can output page-description language (PDL) data if the data is received via a network 003 from a client computer. On the other hand, image data read by the copying machine 001 can be transmitted to another apparatus, such as a file server or a mail server, via the network 003. In a device group 005, the copying machine 001 and the copying machine 002 are different from each other in device configuration.

A management server 004 is connected to the management target device group 005, which includes the copying machine 001 and the copying machine 002, via the network 003. The management server 004 performs communications for device management, such as export and import setting information. The management server 004 can use a conventionally known protocol, such as Hyper Text Transfer Protocol (HTTP), Simple Object Access Protocol (SOAP), or File Transfer Protocol (FTP), in the communications.

A remote user environment 006 is similar to the management server 004 in functionality. The remote user environment 006 is connected to a remote operation terminal 008 via Internet 007. The remote operation terminal 008 is a terminal dedicated to a remote maintenance service. Thus, the remote operation terminal 008 can communicate with the remote user environment 006 to cause the remote user environment 006 to export setting information of an image forming apparatus included in the management target device group 005. The setting information can be stored and can be imported to another image forming apparatus included in the device group or a newly set image forming apparatus, or to an image forming apparatus in another client environment.

The image forming apparatus can directly export setting information to a universal serial bus (USB) storage device 009, without using the management server 004, in response to a predetermined operation performed on an operation panel. The setting information stored in the USB storage device 009 can be appropriately imported to another image forming apparatus.

Figure 2:
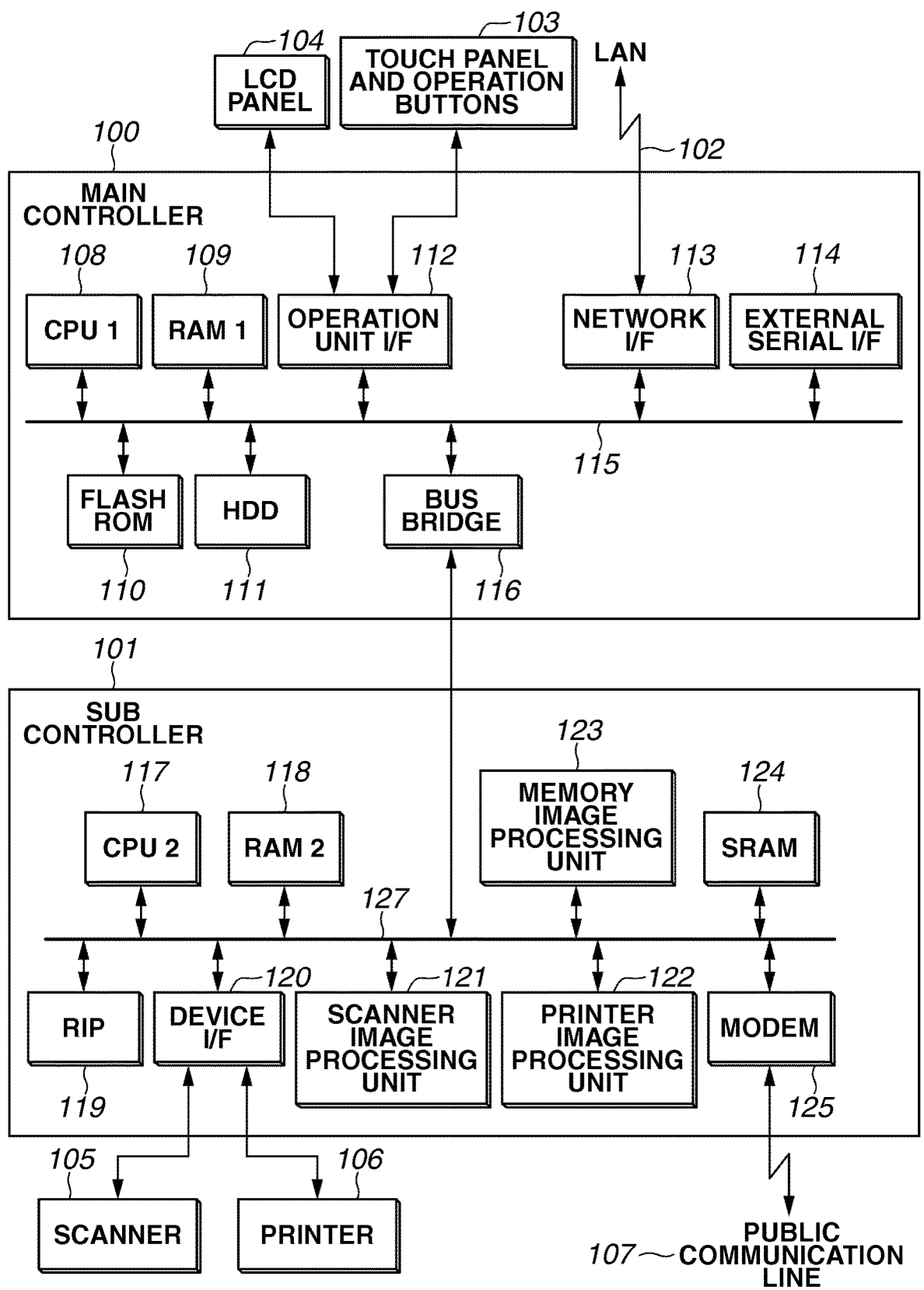
FIG. 2 is a block diagram illustrating a configuration of the image forming apparatus according to an exemplary embodiment of the present invention.

FIG. 2 is a block diagram illustrating a hardware configuration of the image forming apparatus according to the present exemplary embodiment. The image forming apparatus illustrated in FIG. 2 includes a main controller 100 that can serve as an information processing unit of the image forming apparatus. Further, a sub controller 101 can serve as an image processing unit of the image forming apparatus. The main controller 100 includes a bus bridge 116, via which a bus of the main controller 100 is connected to a bus of the sub controller 101. The main controller 100 has the following constituent elements.

The main controller 100 includes a central processing unit (CPU) (1) 108 that can execute software stored in a flash read only memory (FLASH ROM) 110 or in a hard disk drive (HDD) 111. The CPU (1) 108 can control various operations to be performed by respective devices connected to a system bus 115. The FLASH ROM 110 or the HDD 111 is usable as a storage region that can store programs, image data, and user setting data. A random access memory (RAM) (1) 109 is functionally operable as a main memory or a work area for the CPU (1) 108.

An operation unit interface (I/F) 112 can display an image on a liquid crystal display (LCD) panel 104 of the image forming apparatus. Further, the operation unit I/F 112 is connected to a touch panel and/or operation buttons 103. The LCD panel 104 is integrally formed with the touch panel and/or operation buttons 103, to control operator's instructions. A network interface card (NIC) 113 can transmit and receive various data to and from another network device or a file server bidirectionally via a local area network (LAN) 102. An external serial interface 114 is connectable to an external apparatus, such as a memory medium reader or an integrated circuit (IC) card reader, to transmit and receive data bidirectionally.

The sub controller 101 has the following constituent elements. The sub controller 101 is connected to a printing unit (printer) 106, which is capable of performing printing on a paper, for example, according to an electrophotographic method or an inkjet method. Further, the sub controller 101 is connected to an image reading unit (scanner) 105, which is capable of reading an image printed on a paper. In many cases, the image reading unit 105 is equipped with an auto document feeder (not illustrated) as an optional device that can automatically read a plurality of pieces of document content. The sub controller 101 includes a CPU (2) 117, which can transmit and receive a control signal via a device interface 120 to and from each of the printing unit 106 and the image reading unit 105.

The CPU (2) 117 can control various operations to be performed by respective devices connected via a system bus 127. A scanner image processing unit 121 receives an image from the image reading unit 105. The readout image can be temporarily stored in a RAM (2) 118. A memory image processing unit (IMAGEC) 123 can perform image processing on an image of the RAM (2) 118 of the image forming apparatus and can output the processed image to the RAM (2) 118. The image processing to be performed by the memory image processing unit 123 includes various (e.g., rotation, zooming, color space conversion, gray scale conversion, combination, coding, and decoding) processing.

After the memory image processing unit 123 completes the image processing on the image loaded on the RAM (2) 118, the CPU (2) 117 transmits the processed image to the storage apparatus 110 or 111 of the main controller 100 via the bus bridge 116. Further, the CPU (2) 117 can read an image from the storage apparatus 110 or 111 of the main controller 100 via the bus bridge 116 and load the read image into the RAM (2) 118. Further, the CPU (2) 117 can output the read image to the printing unit 106 via a printer image processing unit 122.

Processing to be performed by the scanner image processing unit 121 and the printer image processing unit 122 includes various (e.g., color space conversion, movement, color adjustment, density control, and delay amount control) processing. A raster image processor (RIP) 119 can rasterize a PDL code on the RAM (2) 118 into a bitmap image. The RIP 119 can output the rasterized bitmap image to the RAM (2) 118. A static random access memory (SRAM) 124 can speedily input and output nonvolatile data from and to the CPU (2) 117. A modulator/demodulator (MODEM) 125 is connected to a public communication line 107 and can perform modulation/demodulation to input and output FAX images.

Figure 3:
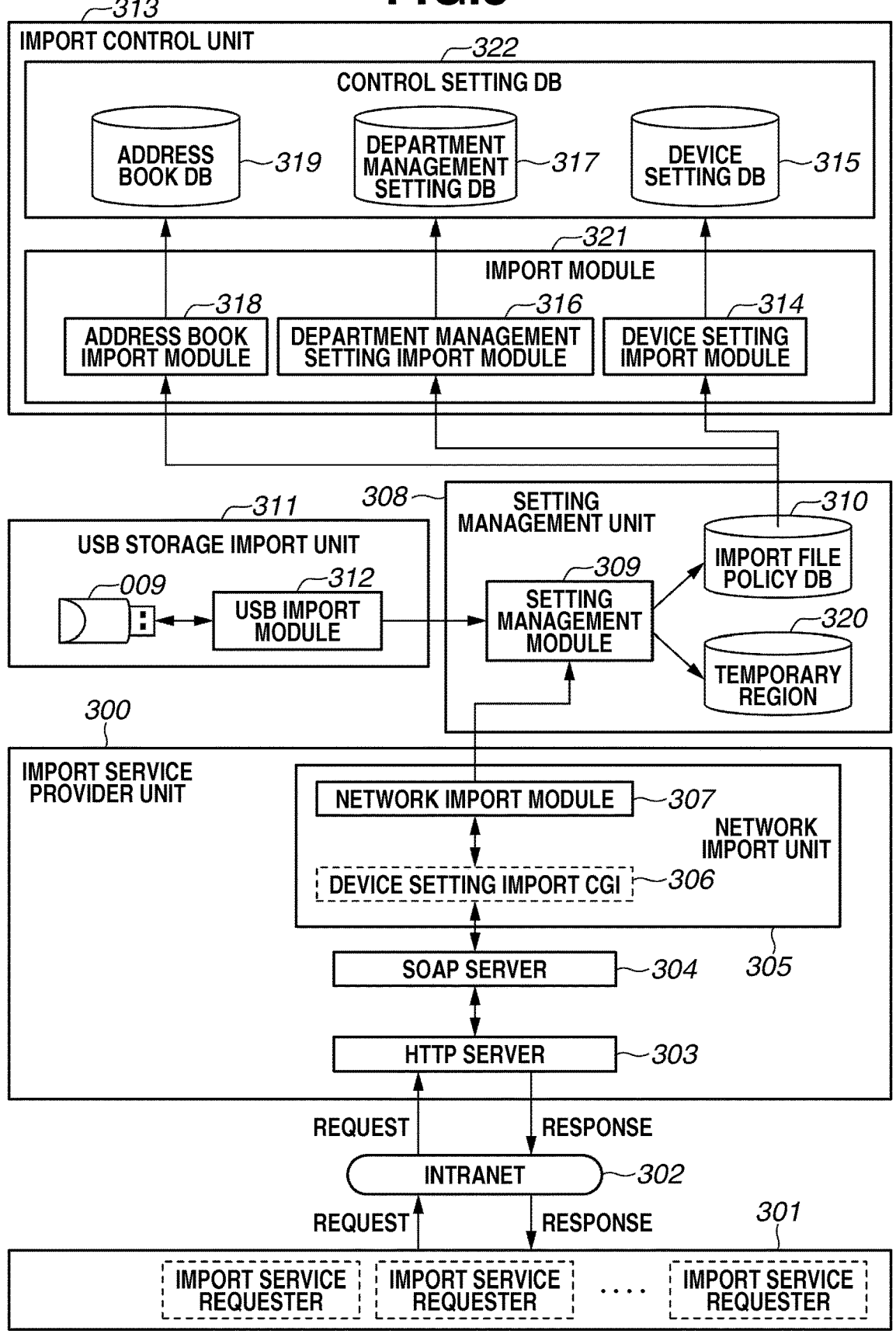
FIG. 3 schematically illustrates an example of a software module according to an exemplary embodiment of the present invention.

FIG. 3 illustrates a system configuration of an import service that can be installed on the image forming apparatus according to the present exemplary embodiment. Example processing relating to network import service is described below. In the present exemplary embodiment, setting information to be imported includes address book data, department management data, and device setting data. An import service requester 301 can transmit setting information, and an import service provider 300 can receive the setting information.

The import service requester 301 can transmit a Simple Object Access Protocol (SOAP) message via an intranet 302 to communicate with the import service provider 300. A HyperText Transfer Protocol (HTTP) server 303 and a SOAP server 304 can interpret the request message and can launch a Common Gateway Interface (CGI) 306 for the processing that corresponds to the received message. A network import module 307 can process a received request. The SOAP server 304 can launch a device setting import CGI 306 with reference to a service request.

The launched CGI causes the network import module 307 to store a setting file that includes the received setting information in a temporary region 320. Then, the launched CGI waits for a response with respect to secondary storage completion. The setting file has a file format including a plurality of XML data compressed together. After completing the primary storage, the launched CGI requests a setting management unit 308 to perform secondary storage processing.

A setting management module 309 can read compression data from the temporary region 320 and can decompress the readout data. If the decompression processing has been successfully completed, the setting management module 309 initializes an import file policy database (DB) 310. If the initialization processing has been successfully completed, the setting management module 309 starts processing for registering information corresponding to each setting item in the policy DB 310 while parsing XML data obtained after completing the decompression processing.

More specifically, the setting management module 309 acquires device identification information, such as machine body management number (serial number) and model management number (or series number), included in the XML data. If the device identification information acquisition has been successfully completed, the setting management module 309 acquires device identification information of an image forming apparatus that is currently executing an import service and determines an import level of the setting information that indicates a setting range to be imported. If the import level is determined, the setting management module 309 registers information relating to the remaining setting items included in the XML data in the policy DB 310.

In the present exemplary embodiment, if there is any setting item that has not been reflected in the policy database, the setting management module 309 registers the non-reflected setting item in a reflection history (not illustrated). The setting management module 309 sends a notification together with setting reflection range (i.e., import level) to an import control unit 313 having been registered beforehand. The setting management module 309 returns a secondary storage completion response to the import request source.

When an import module group 321 of the import control unit 313 receives a notification from the setting management module 309, the import module group 321 performs tertiary storage of setting information having been received together with the notification so that the setting information can be actually used in the control performed by the image forming apparatus. Each import module is prepared to manage setting information that is unique to a specific function of the image forming apparatus or prepared to manage setting information that is common to a plurality of functions of the apparatus.

These import modules extract a part of the setting information that is finally required in an import file. The extracted setting information is reflected in the image forming apparatus. In the present exemplary embodiment, each of the import modules 318, 316, and 314 acquires a part of the setting information that coincides with the setting item of the processing target from the secondarily stored policy DB 310.

The setting information acquired in this case includes setting values and reflection policy. Each import module compares the reflection level notified from the setting management module 309 with the reflection policy. If it is determined that there is setting information to be reflected, each import module registers the setting information to be reflected in a control setting DB 322 so that the import module can be actually used by the image forming apparatus.

In the present exemplary embodiment, the device setting import module 314 reads only the items of the setting information relating to the device setting from the policy DB 310 one by one, and registers the readout setting information to a control device setting DB 315. A department management setting import module 316 reads only the setting information relating to the department management from the policy DB 310 and registers the readout setting information to a control department management setting DB 317. The address book import module 318 reads only the setting information relating to the address book setting from the policy DB 310 and registers the readout setting information to a control address book DB 319.

Next, example processing for importing information from the USB storage is simply described. Like a network import unit 305, a USB storage import unit 311 can perform processing for importing information from the USB storage device 009. A USB import module 312 detects the presence of a setting file in the USB storage device 009. The USB import module 312 stores the setting file in the temporary region 320. Then, the USB import module 312 requests the setting management unit 308 to perform secondary storage processing. The remaining import operation is similar to the network import processing.

Further, each import module acquires meta-information from the secondarily stored policy DB 310, in acquiring setting information corresponding to a setting item to be processed. The import module group 321 performs control relating to the registration method, which is designated by the meta-information, when the setting information is registered to the control setting DB. The control performed by the import module group 321 includes processing relating to encryption, processing for returning the value to the factory shipment value, and processing for prohibiting overwriting the present value.

If the import module group 321 completes the registration of the setting information to be managed to the control setting DB 322, each import module notifies the setting management unit 308 of the completion of the tertiary storage processing. If the completion is notified from all of the import modules to the setting management unit 308, then the setting management unit 308 reboots the image forming apparatus in such a way as to reflect the updated setting values in the next launching processing. The control setting DB 322 according to the present exemplary embodiment is, for example, a static random access memory (SRAM) device, or an HDD device, or a hybrid thereof. The control setting DB 322 is operable speedily and stably. However, the control setting DB 322 is lower in capacity per unit cost and is higher in capacitive constraint.

Figure 4:
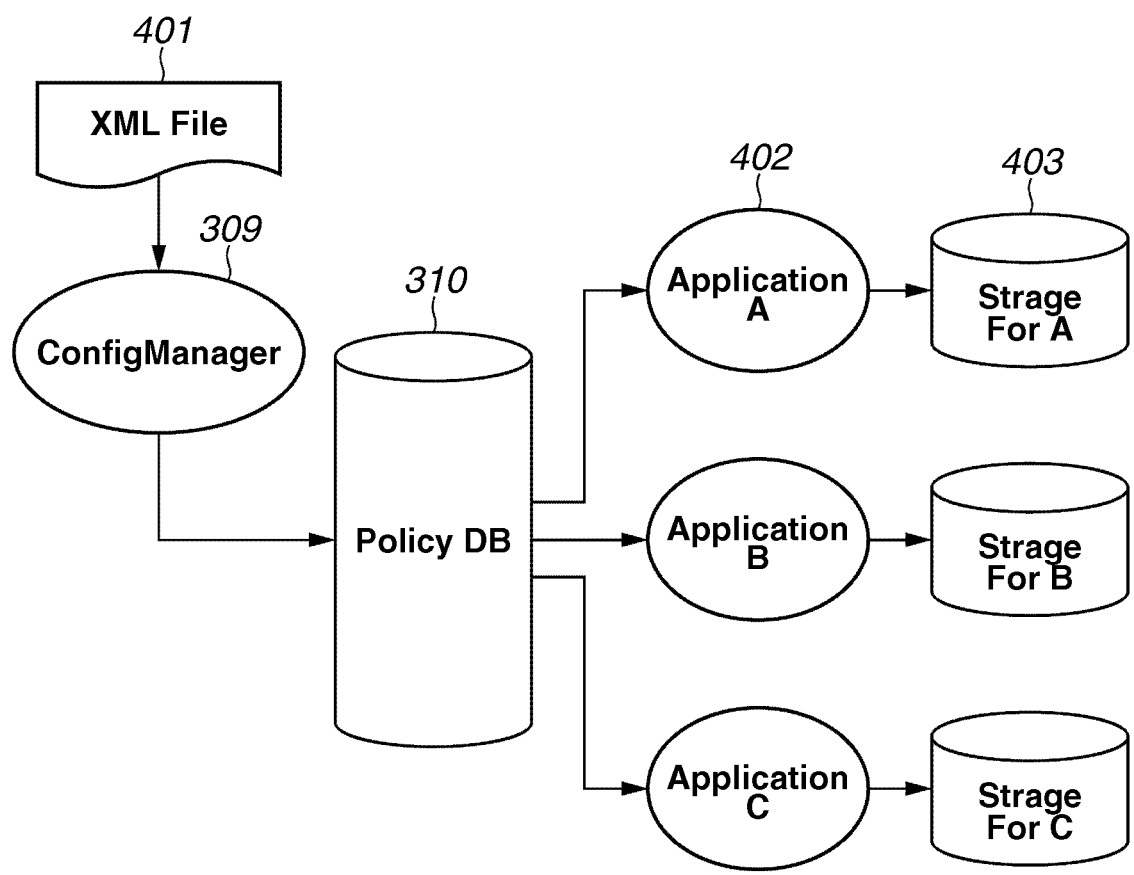
FIG. 4 is a data flow diagram schematically illustrating import processing according to an exemplary embodiment of the present invention.

FIG. 4 is a data flow diagram schematically illustrating the flow of data that corresponds to the primary storage and the subsequent processing in the import processing illustrated in FIG. 3. First, when the import service system starts the import processing, the import service system initializes the policy DB. If the network import module 307 or the USB import module 312 acquires an imported XML file 401 during the import processing, the setting management module 309 stores the acquired XML file 401 in the policy DB 301.

In this case, key information having a name not described in the policy DB is not written to the policy DB 301 even if the description thereof is present in the XML file 401. Further, in a case where size and type information described in the XML file is different from the size and type stored in the policy DB 301, no information is written to the DB.

When the storage of the data into the policy DB 301 is completed, the setting management module 309 sends an import command to each application 402 (e.g., import modules 314, 316, and 318 illustrated in FIG. 3) in the device. In this case, the setting management module 309 transmits an import level calculated based on the information described in the XML to each application 402. An example calculation of the import level is described in detail below.

Each application 402 extracts its own data from the policy DB 301, and compares the notified level with level information included in the meta-information described for each internal key of the policy DB 301. As a result, only the writable one is written to a storage 403 (e.g., 315, 317, and 319 illustrated in FIG. 3) that stores settings to be uses in actual controls.

Figure 5:
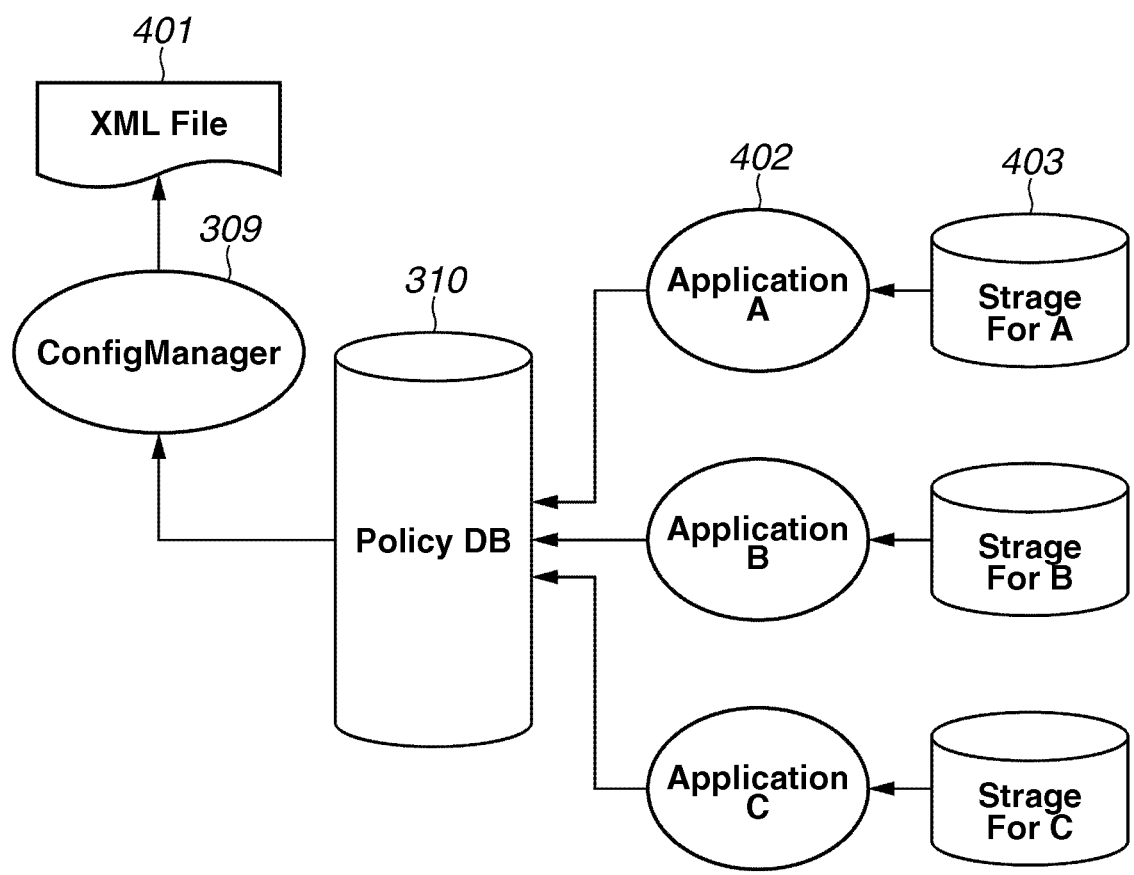
FIG. 5 is a data flow diagram schematically illustrating export processing according to an exemplary embodiment of the present invention.

FIG. 5 is a data flow diagram schematically illustrating the flow of data in the export processing. First, when the import service system starts the export processing, the import service system initializes the policy DB. If each application 402 receives an export instruction from the setting management module 309, each application 402 reads setting information from the storage 403 and writes the readout setting information to the policy DB 310. In this case, each application 402 writes all of the exportable setting items and the value thereof to the DB without considering any policy.

If all of the applications completes writing the setting information to the policy DB 301, the setting management module 309 converts the setting information into XML format data. Further, in this case, the setting management module 309 acquires device identification information of the apparatus itself and writes the acquired information as additional information to the XML file 401. The additional information can be used to determine an import level when the setting information is imported to other apparatus. The XML file 401 including all of the written information can be extracted from the device and exported, as the input XML file described with reference to FIG. 4.

FIG. 6 illustrates an internal schema of the policy DB 310 and an example description of the XML file 401. A conceptual structure 606 of the setting information is constituted by a key having a hierarchy structure, in which each leaf has data, which can be expressed using the DB and the XML.

As a table schema of the DB, a relational DB structure having a KeyID 601 as a relation key is provided. A KeyList table 602 indicates a relationship between a key structure and meta-information. The KeyList table 602 includes descriptions relating to key name definition and meta-information. To realize a tree structure that expresses a hierarchy structure, the KeyList table 602 includes ParentID that indicates a parent hierarchy. According to the illustrated example, the meta-information is expressed as 32-bit bit stream data. In the present exemplary embodiment, the meta-information is regulated using a bit assign format, such as level information.

A ValueList table 603 (i.e., a table which indicates data contents) includes a "Value" field in which actual data is described, a "Size" field in which data size is described, and a "Type" field in which data type is described. In the present invention, no value is described in the "Value" field in an initial state. Further, a ValueRange table 604 includes value range information with respect to the data settable in the "Value" field, as complementary information. An XML file 605 includes tags and elements that are created based on the information described in the ValueRange table 604. As understood from the above-described example, information stored in the DB can be directly expressed as XML data.

Figure 7:
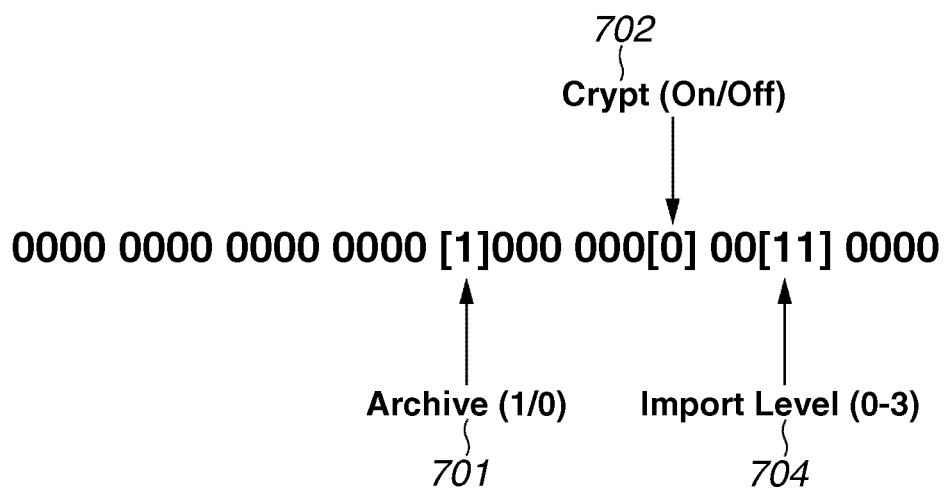
FIG. 7 illustrates a sample of meta-information stored in the DB.

FIG. 7 illustrates an operational example of meta-information that is defined in the KeyList table 602. The example illustrated in FIG. 7 regulates a 4-byte (i.e., 32-bit) region, in which a 4-bit region is used in the present invention.

An Archive bit 701 is a dynamic meta-information flag that is raised when data is written in the import or export processing. The Archive bit 701 can be referred to when XML data to be exported is generated or can be used as a flag to determine whether data is included when XML data is read from the policy DB. A Crypt bit 702 is a static meta-information flag indicating whether to perform data encryption. If the flag is raised with respect to the Crypt bit 702, the data is encrypted in the XML data description. Further, decoding is performed in the data writing from the XML to the policy DB.

Finally, an Import Level 704 is static meta-information to which 2-bit data is assigned so that four types 0 to 3 can be defined. For example, the type "0" indicates that the import/export is disabled. The type "1" indicates that only the backup re-storage for the same model and the same machine is enabled. The type "2" indicates that the import/export between different machines of the same model is enabled. The type "3" indicates that the import/export between different models is enabled. As described in the following sequence, the determined level can be referred to in determining whether to perform the import processing.

Next, sequential processing including reception of an XML file and completion of the import is described below with reference to flowcharts illustrated in FIG. 8 to FIG. 11.

Figure 8:
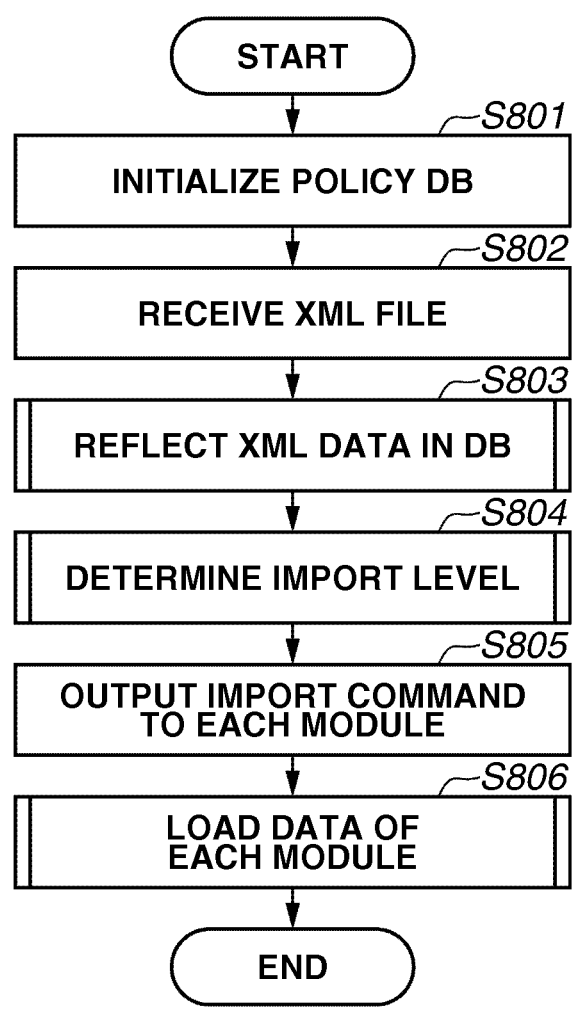
FIG. 8 is a flowchart illustrating an example sequence of the import processing according to a first exemplary embodiment of the present invention.

FIG. 8 is a flowchart illustrating a sequence of import processing. In step S801, the import service system initializes the policy DB. More specifically, the import service system resets all of the values having been written to the DB and further resets the Archive bit 701. The initialized policy DB includes only key name, type, size, and statically defined meta-information and does not include any value.

In step S802, the import service system stores an XML file. In step S803, the import service system parses the content of the XML file and performs secondary storage processing for writing the parsed data in the policy DB. Subsequently, in step S804, the import service system determines an import level with reference to additional information of the receive XML file and information relating to the apparatus that is currently performing the import operation. Subsequently, in step S805, the import service system outputs an import instruction together with the determined import level to each module (see 402). Then, in step S806, the import service system performs a storage (see 403) reflection work for actual use in various control operations of the apparatus.

Figure 9:
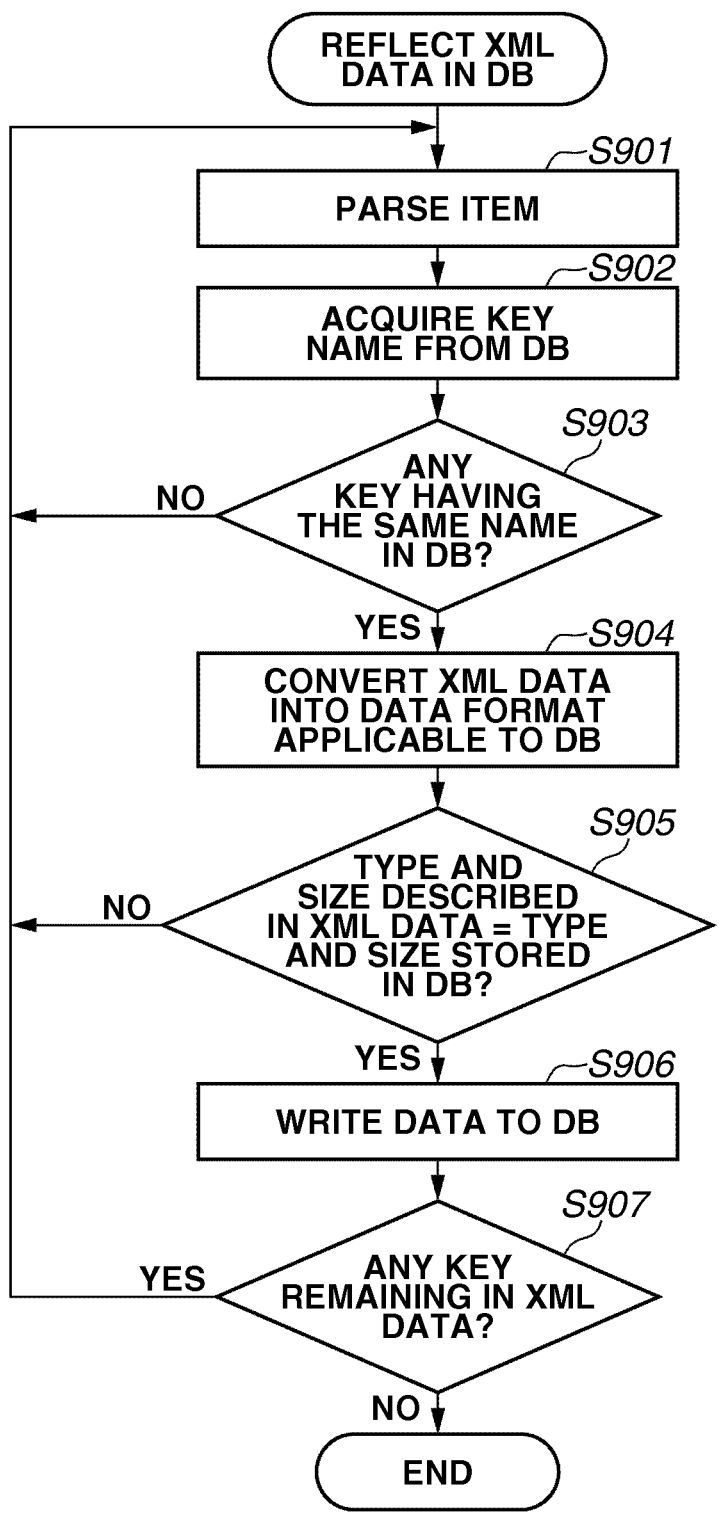
FIG. 9 is a flowchart illustrating an example sequence of the import processing according to the first exemplary embodiment of the present invention.

An example procedure for storing the XML data into the policy DB (i.e., the processing to be performed in step S803) is described below in detail with reference to a flowchart illustrated in FIG. 9. In step S901, the import service system sequentially parses (analyzes) the XML file. As described above with reference to FIG. 6, the XML file 605 has a key expression including tags having values constitute a hierarchy structure.

In step S902, the import service system interprets one key as a target to be analyzed. Then, in step S903, the import service system confirms whether there is any key having the same name in the policy DB. If the key having the same name is not present (NO in step S903), the processing returns to step S901 to parse the next item. If the key having the same name is present in the policy DB (YES in step S903), then in step S904, the import service system acquires a value defined for the corresponding key from the XML file. Then, the import service system converts the acquired value into a data having a format that can be written to the policy DB.

In step S905, the import service system determines whether the data structure is coincident with the size already defined in the DB. If the data structure is not coincident with the size defined in the DB (NO in step S905), the import service system does not perform writing for the item. The processing returns to step S901 to parse the next item.

On the other hand, if coincidence is confirmed in type and size information (YES in step S905), the processing proceeds to step S906. In step S906, the import service system writes the value of the item into the policy DB. In this case, the Archive bit of the meta-information changes to 1. Subsequently, in step S907, the import service system determines whether the writing processing for all items has been completed. If there is not any item value to be written to the policy DB (NO in step S907), the import service system terminates the processing of the flowchart illustrated in FIG. 9. If any item value to be written is present (YES in step S907), the processing returns to step S901 to parse the next item and continues to write data into the policy DB.

Figure 10:
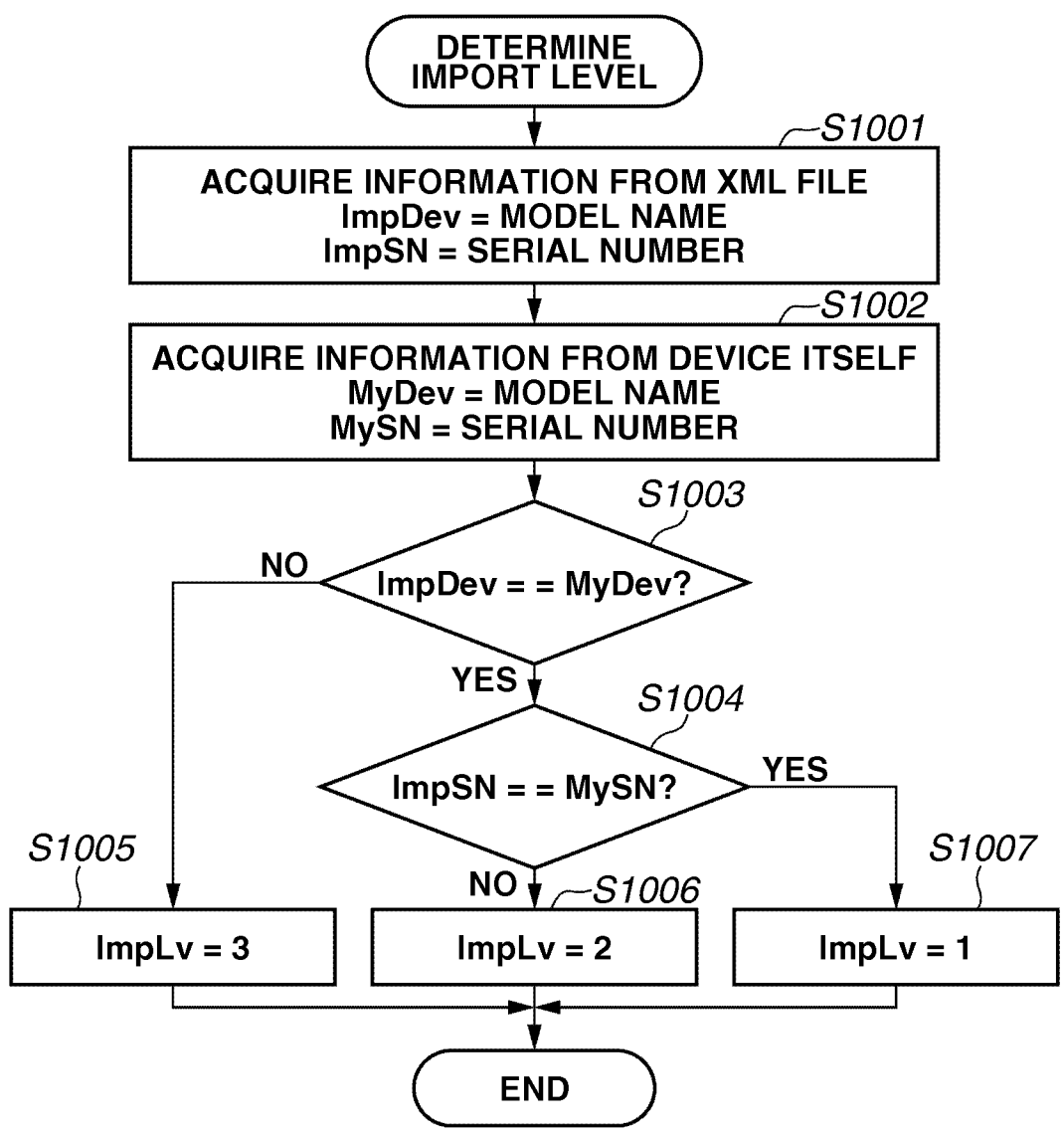
FIG. 10 is a flowchart illustrating an example sequence of the import processing according to the first exemplary embodiment of the present invention.

An example of the processing for determining the import level (i.e., the processing to be performed in step S804) is described below in detail with reference to a flowchart illustrated in FIG. 10. In step S1001, the import service system acquires device identification information (e.g., model management number (or model code) and machine body management number (or serial number)) of the apparatus that has performed the export processing, with reference to the additional information of the XML file.

In step S1002, the import service system reads and acquires device identification information (e.g., model management number and machine body management number) of the apparatus itself. The import service system determines an import level based on the device identification information acquired in step S1001 and step S1002, in the following manner.

In step S1003, the import service system determines whether the model management number described in the XML file is coincident with the model management number of the apparatus itself. If the model management number described in the XML file is not coincident with the model management number of the apparatus itself (NO in step S1003), the import service system determines that the import has been performed from another model. Then, in step S1005, the import service system sets the import level to 3.

If coincidence is confirmed in the model management number (YES in step S1003), the import service system determines that the model is the same. Then, the processing proceeds to step S1004. Subsequently, in step S1004, the import service system compares the machine body management number described in the XML file with the machine body management number of the apparatus itself. If coincidence is not confirmed in the machine body management number (NO in step S1004), the import service system determines that the setting information has been acquired from a same model apparatus having another machine body number. Then, in step S1006, the import service system sets the import level to 2. If coincidence is confirmed in the machine body management number (YES in step S1004), the import service system determines that the processing is for backup re-storage of its own model. Then, in step S1007, the import service system sets the import level to 1.

Figure 11:
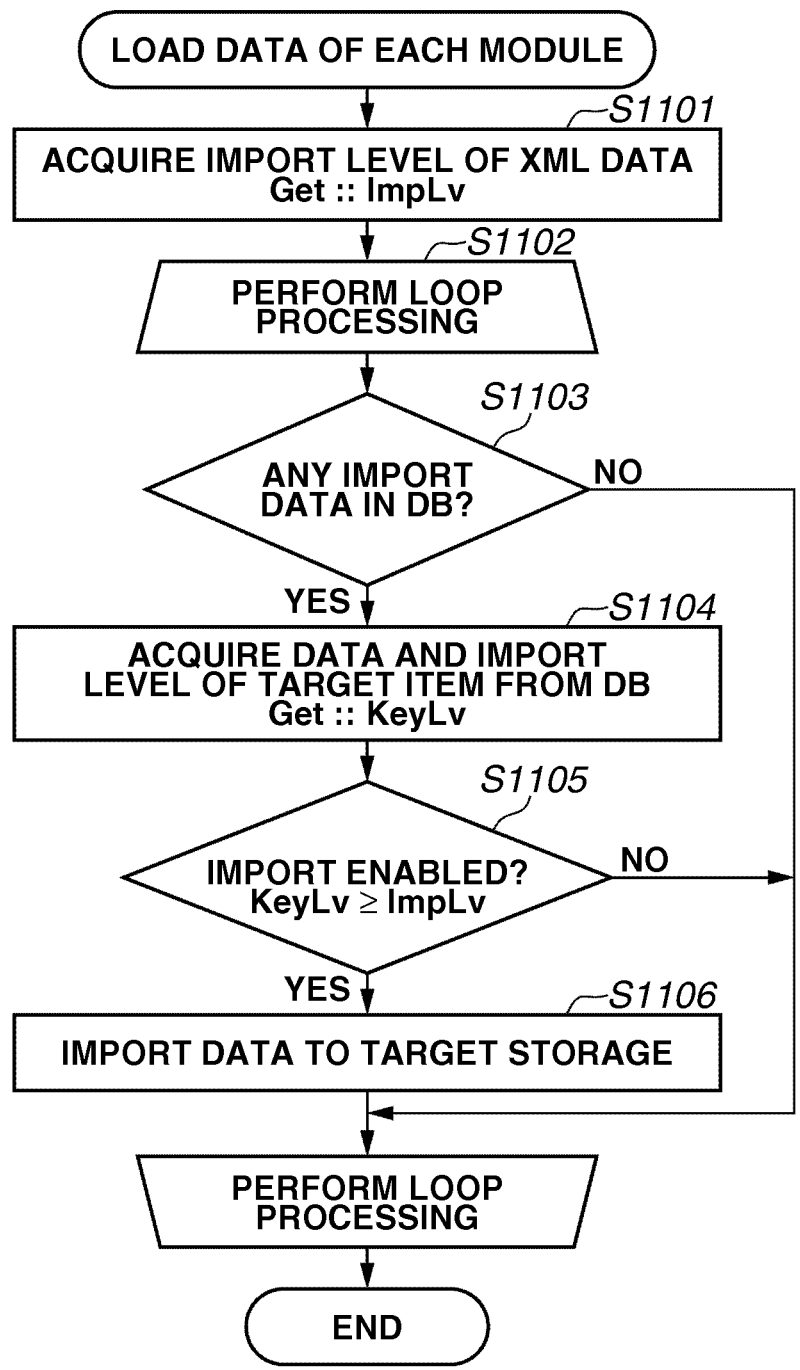
FIG. 11 is a flowchart illustrating an example sequence of the import processing according to the first exemplary embodiment of the present invention.

An example of the data loading processing (i.e., the processing to be performed in step S806) is described below in detail with reference to a flowchart illustrated in FIG. 11. The processing illustrated in FIG. 11 can be called as one of sequentially performed processing in a single task or can be executed simultaneously for a plurality of tasks. The number of executions with respect to the processing illustrated in FIG. 11 is equal to the number of applications (402) that are present in the device.

First, in step S1101, the import service system confirms the import level determined in the processing described with reference to FIG. 9. Then, the module corresponding to each application in the apparatus itself repeats the processing of step S1102 and subsequent steps to import a setting to be reflected, which is included in the XML file (i.e., the setting information) together with its value.

In step S1103, the module corresponding to each application inquires the DB about an arbitrary item to check the presence of a secondarily stored setting stored in the policy DB. More specifically, the module determines whether the Archive bit 701 is raised. If the presence of any secondarily stored setting is not confirmed (NO in step S1103), the module checks the next item. If the presence of the secondarily stored setting is confirmed (YES in step S1103), then in step S1104, the module acquires the setting and confirms level information included in the meta-information of its key defined in the policy DB.

In step S1105, the module compares the import level confirmed in step S1101 with the key level of its key and determines whether the setting is importable. For example, if the meta-information defined for the key is key level 1 (i.e., backup re-storage for the same machine is enabled) and import level 3 (i.e., an import from a different model), the import is not feasible. Therefore, the module checks the next item without importing any setting.

Further, for example, if the defined meta-information is key level 3 (i.e., import/export between different models is enabled) and import level 1 (i.e., backup re-storage for the same machine is enabled), reflecting the imported setting is feasible. Therefore, the processing proceeds to step S1106, in which the module writes the setting to the storage.

Figure 12:
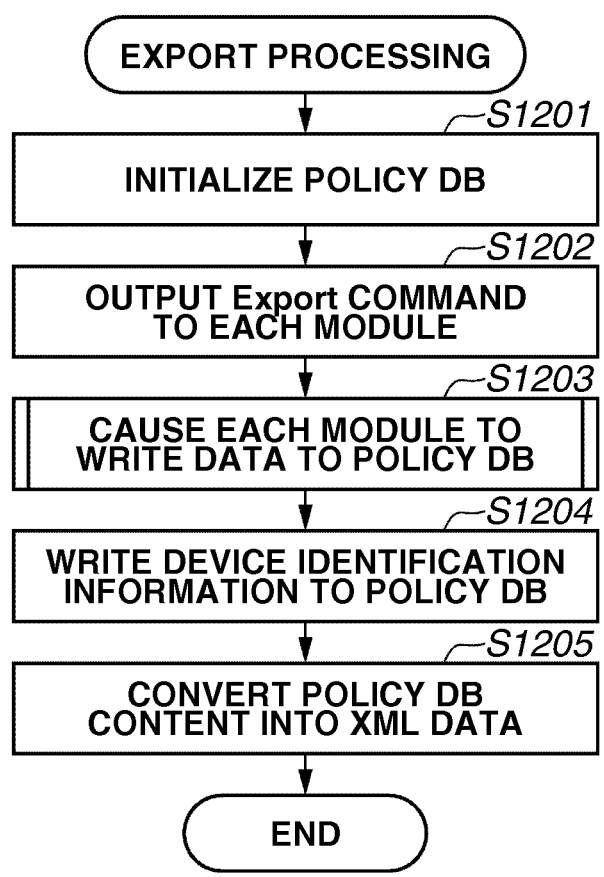
FIG. 12 is a flowchart illustrating an example sequence of the import processing according to the first exemplary embodiment of the present invention.

An example of the export processing is described below in detail with reference to a flowchart illustrated in FIG. 12, which corresponds to details of the operation in the above-mentioned data flow diagram illustrated in FIG. 5. First, in step S1201, the system initializes the policy DB 310. Thus, no value is written in the "Value" field.

In step S1202, an export instruction is sent to the module 402 of each application. In step S1203, each module extracts setting information from the storage 403 and writes the extracted information to the policy DB 310. In this case, the module writes all of the related data to the policy DB 310 without considering the level added in the import processing. In step S1204, the module extracts device identification information of the apparatus itself and writes the extracted information to the policy DB. The device identification information includes model management number and machine body management number (SN). In step S1205, the module converts the setting information written to the policy DB into XML format data and generates the XML file 401.

A second exemplary embodiment of the present invention is characterized in that a further unique determination is performed in the above-mentioned import level determination processing (see step S804). More specifically, in the import of the setting information, the present exemplary embodiment intends to import setting information appropriately considering device identification information other than the model management number (or model code) and the machine body management number (or serial number).

FIG. 13 illustrates a list of information usable as determination factors of the import level in the present exemplary embodiment. More specifically, the determination factors of the import level includes various information relating to the image forming apparatus, such as firmware version, destination information, paper size standards information, policy DB version, user editing information, accessory connection information, and license information.

FIG. 14 is a table that illustrates examples with respect to the import level determination based on the determination factors illustrated in FIG. 13. In the table illustrated in FIG. 14, an item indicated using a hyphen "-" is a "Don't Care" item whose content is not cared. In the second exemplary embodiment, the system determines the import level with reference to the table illustrated in FIG. 14. The table illustrated in FIG. 14 indicates that an appropriate import level is determined based on each combination of a plurality of determination factors.

In the present exemplary embodiment, the meaning of the import level is similar to that described in the first exemplary embodiment. More specifically, level 0 indicates that the import is disabled, and level 1 indicates that the backup re-storage for the same apparatus is enabled. Further, level 2 indicates that an import from the same model is enabled, and level 3 indicates that an import from a different model is enabled.

In case 1, the user editing information is "YES." In this case, the import level is set to "1" regardless of the state of other determination factors. The import level "1" expresses the policy that information edited by a user is accepted entirely. In case 2, the user editing information is "NO" and the destination information is "coincident with" that of the device that is performing an import operation. Further, the model management number is "not coincident with" that of the import executing device. In the case 2, the import level is set to "3." The case 2 indicates a behavior similar to the import from a different model described in the first exemplary embodiment.

In case 3, the user editing information is "NO" and the destination information is "coincident with" that of the import executing device. Further, the model management number is "coincident with" that of the import executing device. The machine body management number (SN) is "not coincident with" that of the import executing device. Further, the firmware version is "newer than the specific version." In the case 3, the import level is set to "2." The case 3 indicates a behavior similar to the import from a different machine of the same model described in the first exemplary embodiment.

In case 4, the user editing information is "NO" and the destination information is "coincident with" that of the import executing device. Further, the model management number is "coincident with" that of the import executing device. The machine body management number (SN) is "coincident with" that of the import executing device. Further, the firmware version is "newer than the specific version." In the case 4, the import level is set to "1." The case 4 indicates a behavior similar to the import from a different machine of the same model described in the first exemplary embodiment.

In case 5, the user editing information is "NO" and the destination information is "coincident with" that of the import executing device. Further, the model management number is "coincident with" that of the import executing device. Further, the firmware version is "older than the specific version." In the case 5, the import level is set to "3." The case 5 expresses a policy that causes a behavior comparable to a different model because the firmware is old although the model is the same.

In case 6, the user editing information is "NO" and the destination information is "not coincident with" that of the import executing device. In the case 6, the import level is set to "0." In other words, no import can be accepted in the case 6.

The settings of the table illustrated in FIG. 14 are arbitrarily settable considering various policies. For example, regarding the firmware version (i.e., one of the determination factors referred to in the cases 3, 4, and 5), setting information to be operated may be differentiated due to the different in the firmware version even if the model is the same. More specifically, in a case where the specification is greatly changed due to version-up, importing information having been backed-up when the firmware is an older version to the same model of a new version is regarded as an import from a different model.

Further, regarding the user editing information that has been changed by a user using the application (see case 1), flag information indicating that editing has been performed by the user is used as a setting attribute in an XML file. If the flag is raised, the import level is set to "1" so that the setting information can be imported unconditionally. Thus, it is feasible to prevent a control that blocks the user's intended editing (i.e., a control that prevents the user's intended editing from being reflected).

Further, it is useful that information relating to an accessory connected to the apparatus itself, which can be identified based on accessory connection information, or the license operated by the apparatus itself that can be identified based on license information, is taken into consideration if it is desired to realize an importing method including removing unnecessary settings, extracting only necessary settings, and reflecting the extracted settings. In the present exemplary embodiment, the import level can be determined appropriately. Similar to the first exemplary embodiment, it is feasible to determine whether to perform the import processing actually while comparing the determined import level with level information of each key defined in the policy DB 310.

A third exemplary embodiment of the present invention is characterized in performing filter processing in the export of the setting information. The processing according to the third exemplary embodiment is described below with reference to flowcharts illustrated in FIG. 15 and FIG. 16.

Figure 15:
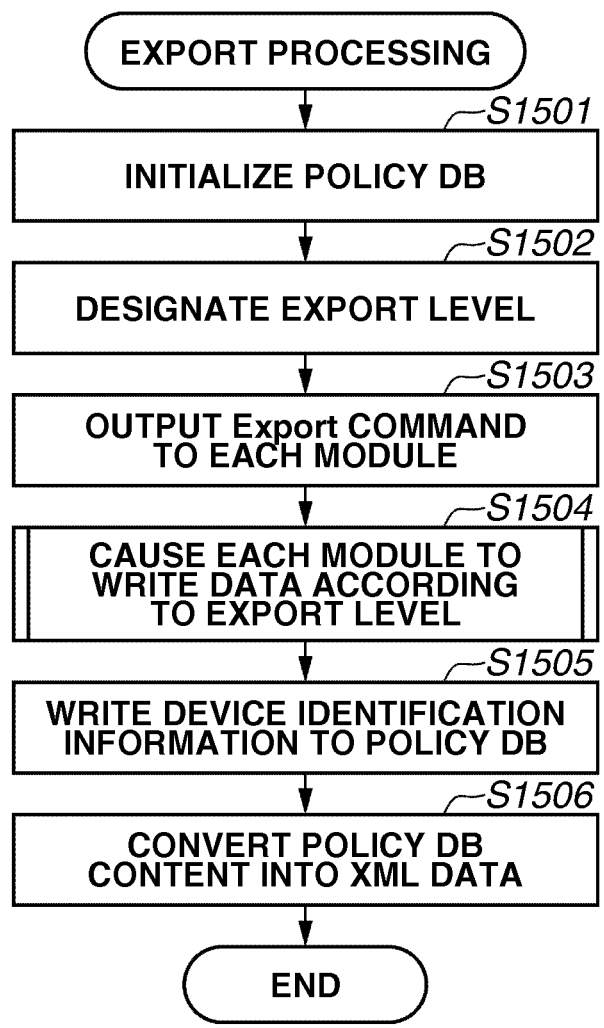
FIG. 15 is a flowchart illustrating an example sequence of the export processing according to a third exemplary embodiment of the present invention.

FIG. 15 is a flowchart illustrating example export processing according to the present exemplary embodiment. First, in step S1501, the system initializes the policy DB 310. In step S1502, the system determines an export level in response to a user's instruction. More specifically, the system enables a user to select a desired one of different model oriented/same model oriented/backup re-storage with respect to the usage of the setting information to be exported, and determines the export level based on the user's selection.

In step S1503, an export instruction is sent to the module 402 of each application. If the export instruction is received, then in step S1504, each module extracts setting information from the storage 403 and writes the extracted information to the policy DB 310. In this case, the present exemplary embodiment is different from the above-mentioned exemplary embodiment in that the export level is referred to in extracting the necessary setting and writing the extracted setting to the policy DB. Subsequently, in step S1505, the system extracts device identification information and writes the extracted information to the policy DB. In step S1506, the system converts the information to be written into XML format data and generates the XML file 401.

Figure 16:
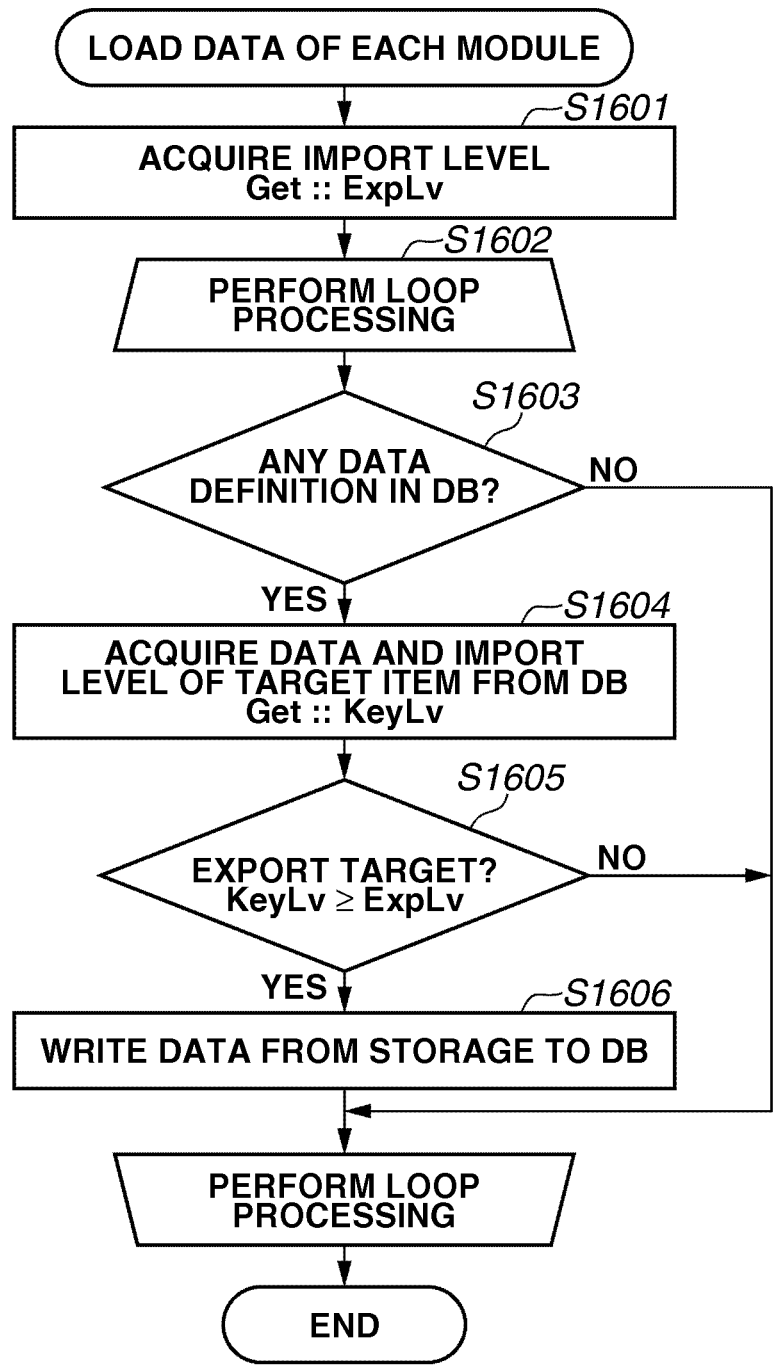
FIG. 16 is a flowchart illustrating an example sequence of the export processing according to the third exemplary embodiment of the present invention.

FIG. 16 is a flowchart illustrating details of the above-mentioned processing to be performed in step S1504. In step S1601, in response to the export instruction, each module confirms the export level determined in step S1502. In step S1602, the module of each application repeats the processing in the following steps for the setting items relating to the application thereof. If the processing of all items is completed, the system completes the loop processing and terminates the processing of step S1504.

In step S1603, the system determines whether the definition of the setting item to be exported is present in the policy DB 310. If the definition of the setting item is not present, the system checks the next item. If the definition of the setting item is present, then in step S1604, the system acquires a key level defined in the policy DB 310. In step S1605, the system compares the export level with the key level and determines whether the key level corresponds to the present export level. If it is determined that the key level corresponds to the present export level (YES in step S1605), then in step S1606, the system writes the setting item and its value from the storage 403 to the policy DB 310.

The present exemplary embodiment is different from the other exemplary embodiments in that only the necessary setting information is exported. Thus, the amount of data movement between the export of the data from one apparatus and the import of the data in another apparatus can be reduced. Further, the amount of data to be analyzed in the import processing can be reduced. Thus, the import processing can be performed efficiently.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus configured to control a plurality of applications according to setting information and a pluraltiy of import modules, each import module corresponding to different one of the plurality of applications, the image forming apparatus comprising:
    a memory;
    a policy database;
    a network interface circuit and a Universal Serial Bus interface, wherein a file including file setting information is obtained via either one or both of the network interface circuit and the Universal Serial Bus interface and the file setting information is written to the policy database; and
    a hardware processor executing instructions in the memory to:
    acquire a model management identifier and a serial number from the obtained file,
    determine, from among a plurality of levels, an import level that is to be used for determining a setting value to which reflection is allowed, from among a plurality of setting values included in the file setting information in the obtained file,
    wherein, in a case where the model management identifier acquired from the obtained file matches a model management identifier of the image forming apparatus and the serial number acquired from the obtained file matches a serial number of the image forming apparatus, a first level is determined as the import level,
    wherein, in a case where the model management identifier acquired from the obtained file matches the model management identifier of the image forming apparatus and the serial number acquired from the obtained file does not match the serial number of the image forming apparatus, a second level is determined as the import level, and
    wherein, in a case where the model management identifier acquired from the obtained file does not match the model management identifier of the image forming apparatus, a third level is determined as the import level, and
    output an import instruction of the file setting information in the policy database and the determined import level to each import module,
    wherein, by each import module, only a plurality of setting values of own pertaining to the import module itself, not the other import modules, is read out of the file setting information in the policy database, and whether to reflect or not is determined based on the determined import level for each setting value included in the plurality of setting values.

2. The image forming apparatus according to claim 1, wherein the file setting information includes at least one of device setting information, department identification setting and address book information.

3. A method for controlling an image forming apparatus configured to control a plurality of applications according to setting information and a plurality of import modules, each import module corresponding to different one of the plurality of applications, wherein the image forming apparatus includes a policy database, a network interface circuit, and a Universal Serial Bus interface, the method comprising:
    obtaining a file including file setting information via either one or both of the network interface circuit and the Universal Serial Bus interface and writing the file setting information to the policy database;
    acquiring a model management identifier and a serial number from the obtained file;
    determining, from among a plurality of levels, an import level that is to be used for determining a setting value to which reflection is allowed, from among a plurality of setting values included in the file setting information in the obtained file,
    wherein, in a case where the model management identifier acquired from the obtained file matches a model management identifier of the image forming apparatus and the serial number acquired from the obtained file matches a serial number of the image forming apparatus, a first level is determined as the import level,
    wherein, in a case where the model management identifier acquired from the obtained file matches the model management identifier of the image forming apparatus and the serial number acquired from the obtained file does not match the serial number of the image forming apparatus, a second level is determined as the import level, and
    wherein, in a case where the model management identifier acquired from the obtained file does not match the model management identifier of the image forming apparatus, a third level is determined as the import level; and
    outputting an import instruction of the file setting information in the policy database and the determined import level to each import module,
    wherein, by each import module, only a plurality of setting values of own pertaining to the import module itself, not the other import modules, is read out of the file setting information in the policy database, and whether to reflect or not is determined based on the determined import level for each setting value included in the plurality of setting values.

* * * * *